No. 163,451. Patented May 18, 1875.

UNITED STATES PATENT OFFICE.

CHARLES BUCKNER, JR., OF SAN FRANCISCO, CALIFORNIA, ASSIGNOR OF ONE-HALF HIS RIGHT TO JOHANN H. A. LUDWIG, OF SAME PLACE.

IMPROVEMENT IN WAVE-POWER MACHINES.

Specification forming part of Letters Patent No. 163,451, dated May 18, 1875; application filed September 7, 1874.

*To all whom it may concern:*

Be it known that I, CHARLES BUCKNER, Jr., of the city and county of San Francisco, State of California, have invented an Improvement in Wave-Power Machines, of which the following is a specification:

My invention consists, essentially, of a floating buoy, operating vertically up and down within the guide-posts of a wharf, and provided with pivoting-racks, that project above the flooring of this wharf, so as to gear into loose pinions, which, by means of pawls attached, actuate ratchet-wheels fixed onto the common shaft, that communicates with suitable mechanism for pumping, compressing air, &c. While this buoy, by being also provided with metallic guide-rods, that work within sockets arranged in the wharf-flooring, is insured in its vertical movements, and also by a provision of slide-rests, the withdrawal or ungearing of one or both of the racks, as may be required, can be readily effected; the object of this part of my invention being to utilize either the power developed by the rise or fall, or rise and fall combined, of the waves on such buoy as may be most desirable for the purposes to which this force is to be applied.

The second part of my invention consists of triangularly-shaped caissons affixed to the wharf structure on each side of this buoy, so that as the waves advance they may be crowded in between these wedge-shaped projections, and, by the compression of the water into a smaller space, necessarily cause the buoy to rise higher, and thus secure an increase of power.

Figure 1:
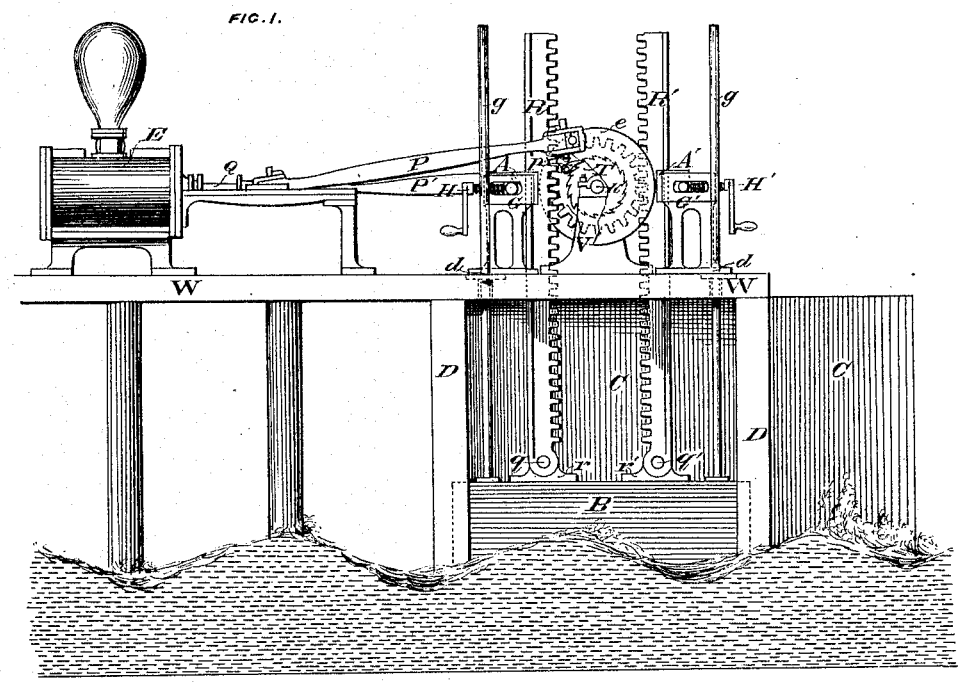
Figure 2:
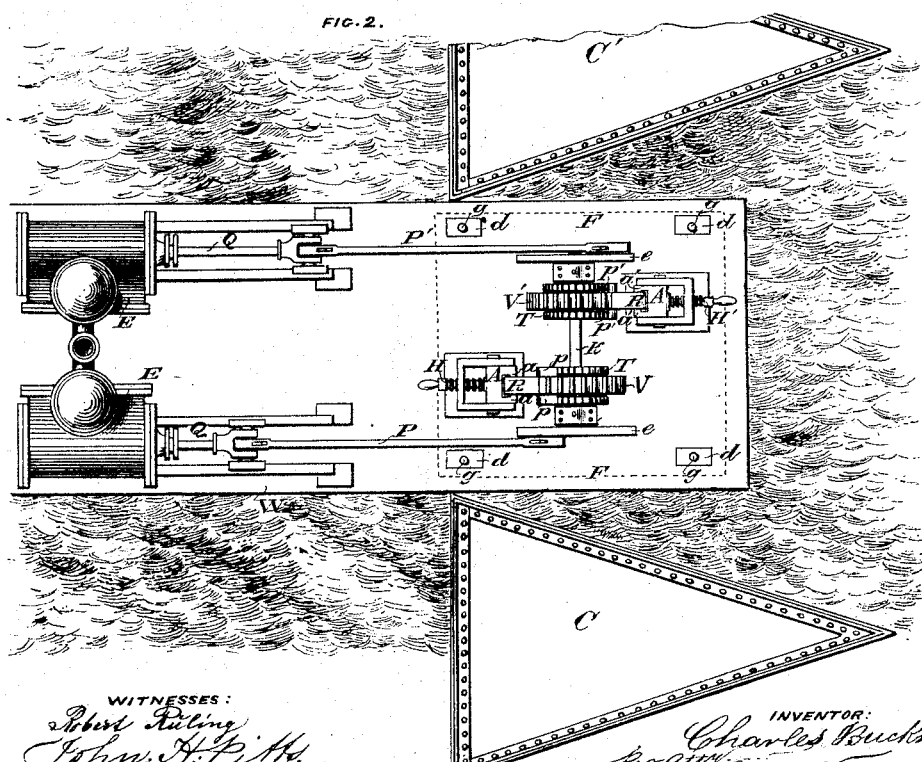

Figure 1 is a vertical longitudinal elevation of a wave-power embodying my invention. Fig. 2 is a plan of Fig. 1.

With reference to the drawings, W W represent a suitable wooden structure, such as a wharf, which extends into the water for a certain distance, and is provided with ordinary wooden guide-posts D D, in which a square-shaped buoy moves vertically up and down. At each corner of this buoy B a strong metallic guide-rod, $g$, is fixed, so that they may slide vertically within metallic sockets $d\ d\ d\ d$, fitted to the flooring F F of the wharf, and thus secure the steadiness of the buoy's movements. Between the guide-rods $g\ g\ g\ g$ two large metallic racks, R R', are pivoted at $g\ g'$, respectively, to eyes $r\ r'$, fixed to the buoy, so that these racks may project through apertures in the wharf-flooring, and gear into pinions V V', fitted loosely onto a shaft, $k$, the length of these racks being such as to always insure their gearing into these pinions, whatever may be the rise or fall of the tides or waves. Onto these loose pinions pawls $p\ p$ are arranged, so as to actuate ratchet-wheels T T', fixed to this shaft $k$, on one or both sides of them. To the shaft $k$ fixed wheels $e\ e'$ are provided, so that by means of connecting-rods and pistons P P' Q Q', respectively, pumps E E' may be operated, as movement is communicated to the same for the independent or joint action of the racks R R'. For preserving each of these racks R R' in a vertical position for engaging the loose pinions V V', and also for ungearing them when necessary, slide-rests G G', with slide-blocks A A', are arranged for their adjustment. Each of these blocks A A' is provided with projecting tongues $a\ a\ a'\ a'$, which fit into corresponding grooves prepared in each rack, and by means of a screw and handle, H H', fitted to the rest G G', such block is made to advance or retreat, so as to cause such rack to be geared or ungeared from its pinion, as may be desired. On each side of this wharf W W, and projecting from it, caissons C C' are ballasted and sunk, and being of a triangular shape, and flanking the buoy on those sides exposed to the incoming waves, necessarily crowd such waves into a more confined space, and thus, by their increased height, cause the buoy B to rise higher than would naturally be produced by the swell on the water alone.

By this general arrangement, as the waves advance onto this buoy, they will float it commensurate with the height the wedge-shaped caissons C C' force them to rise to, and in so doing cause the pivoted racks R R' to engage the loose pinions V V', respectively. One of these pinions, V, will necessarily actuate its ratchet-wheels T by the pawls $p$; but the other pawls, $p'$, will slip over the ratchets T' during such ascent, while in the subsidence or fall of the waves the latter will engage the ratchets T'—the former not operating—so that a continuous action is produced on the shaft $k$, and communicated directly to the pumps E E', for raising water, compressing air, &c., as power may be required. If one or both racks, with mechanism attached, should require repairs, or it should be considered more advantageous to utilize only the upward or downward movements of this buoy, the slide-rests, with block and screw attachments G G' A A' H H', answer the full purpose for their necessary withdrawal or adjustment, as the case may be.

I claim as my invention—

1. The buoy B, actuated by the rise and fall of the waves, provided with guide-rods $g$ $g$ $g$ $g$, that operate within the fixed socket-plates $d$ $d$ $d$ $d$, and adjustable racks R R', for engaging the loose pinions V V', pawls $p$ $p'$, ratchet-wheels T T', and pumping or other apparatus E E', as described, substantially as and for the purposes herein set forth and specified.

2. The wedge-shaped caissons C C', attached to the wharf structure W W, in combination with the waves and floating buoy B, substantially as and for the purposes herein set forth and specified.

3. The slide-rests G G', with adjustable blocks A A', provided with tongues $a$ $a a'$ $a'$, respectively, in combination with the racks R, R', pivoting onto buoy B, substantially as and for the purposes specified.

CHARLES BUCKNER, Jr.

Witnesses:
ALFRED C. CRANE,
LIONEL VARICAS.